United States Patent
Ayame et al.

(10) Patent No.: US 7,471,472 B2
(45) Date of Patent: Dec. 30, 2008

(54) LENS SYSTEM ASSEMBLING METHOD AND SPACING JIG

(75) Inventors: Daisuke Ayame, Saitama (JP); Hiroshi Fujita, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 60 days.

(21) Appl. No.: 11/790,627

(22) Filed: Apr. 26, 2007

(65) Prior Publication Data

US 2007/0253077 A1 Nov. 1, 2007

(30) Foreign Application Priority Data

Apr. 27, 2006 (JP) ............... 2006-123778

(51) Int. Cl.
*G02B 7/02* (2006.01)
(52) U.S. Cl. .................. 359/819; 359/811; 359/822
(58) Field of Classification Search .......... 359/811, 359/819–823
See application file for complete search history.

(56) References Cited

U.S. PATENT DOCUMENTS

| 6,594,204 B1 | 7/2003 | Yamamoto et al. | |
| 6,657,798 B1 * | 12/2003 | Kabelevs et al. | 359/819 |
| 6,710,947 B1 * | 3/2004 | Momot et al. | 359/819 |
| 2003/0179469 A1 | 9/2003 | Maeda et al. | |
| 2004/0158129 A1 | 8/2004 | Okada et al. | 600/168 |

FOREIGN PATENT DOCUMENTS

| DE | 100 15 953 A1 | 10/2000 |
| JP | 2003-262774 A | 9/2003 |
| JP | 2004-302157 A | 10/2004 |

* cited by examiner

*Primary Examiner*—Mohammed Hasan
(74) *Attorney, Agent, or Firm*—Birch, Stewart, Kolasch & Birch, LLP

(57) ABSTRACT

In a lens system assembling method, the spacing between two mutually opposing lenses are set more accurately. The method includes the steps of: holding a first lens with a lens holding member, with the opposing lens face of the first lens being brought into close contact with a first receiving face of a spacing jig, and a lens receiving face of the lens holding member being brought into close contact with a second receiving face of the spacing jig; removing the spacing jig from the first lens and the lens holding member holding the first lens; and setting the spacing between the mutually opposing first and second lenses at a predetermined distance by abutting the second lens to the lens receiving face of the lens holding member such that the opposing lens face of the second lens is brought into close contact with the lens receiving face.

7 Claims, 4 Drawing Sheets

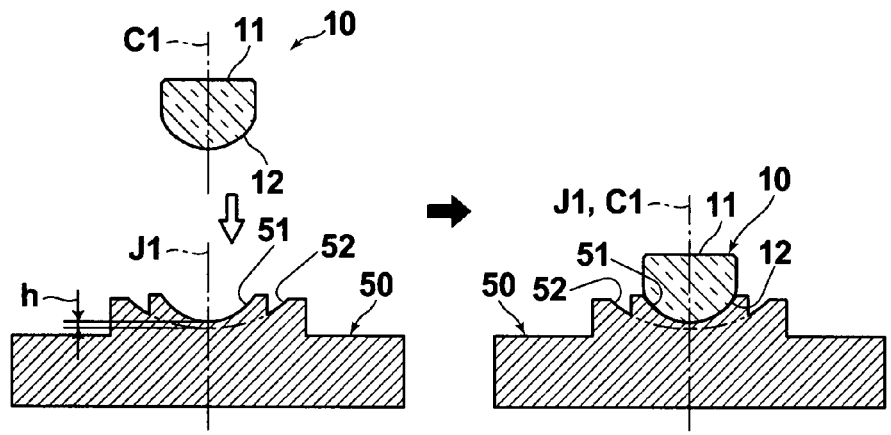
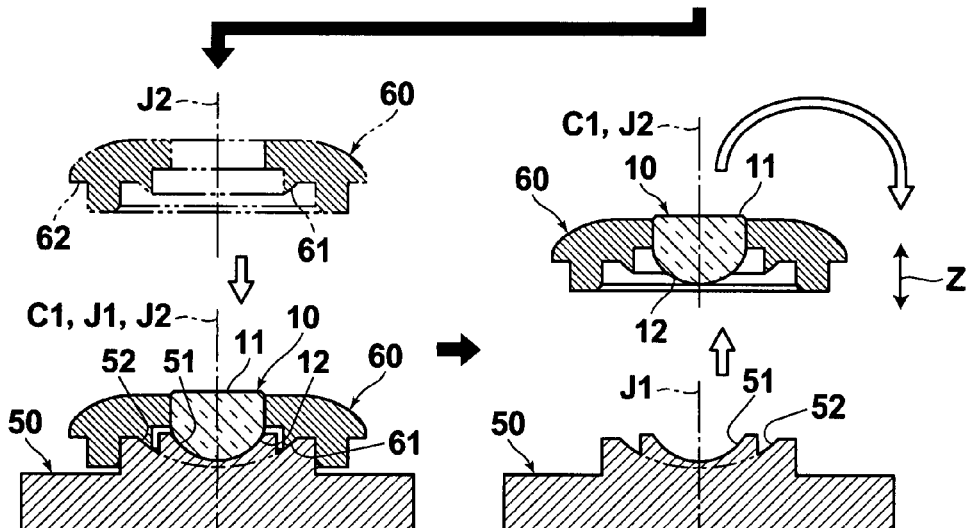
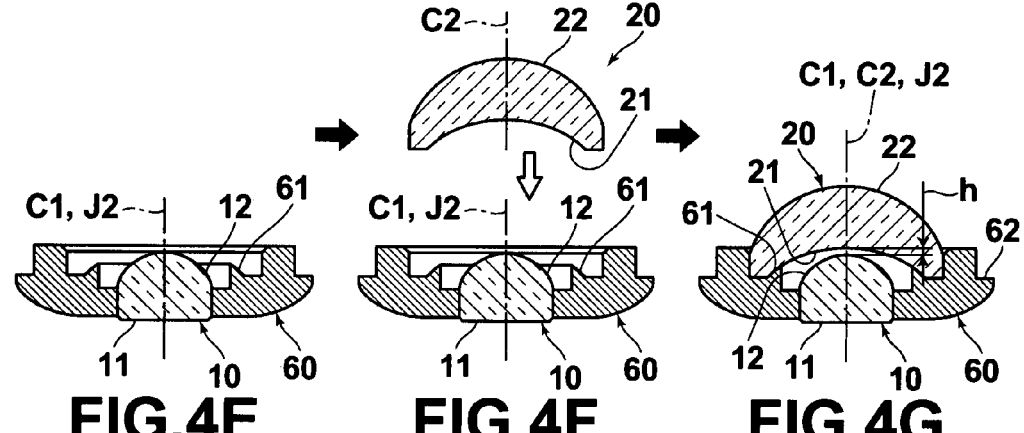
FIG.4A FIG.4B FIG.4C FIG.4D FIG.4E FIG.4F FIG.4G

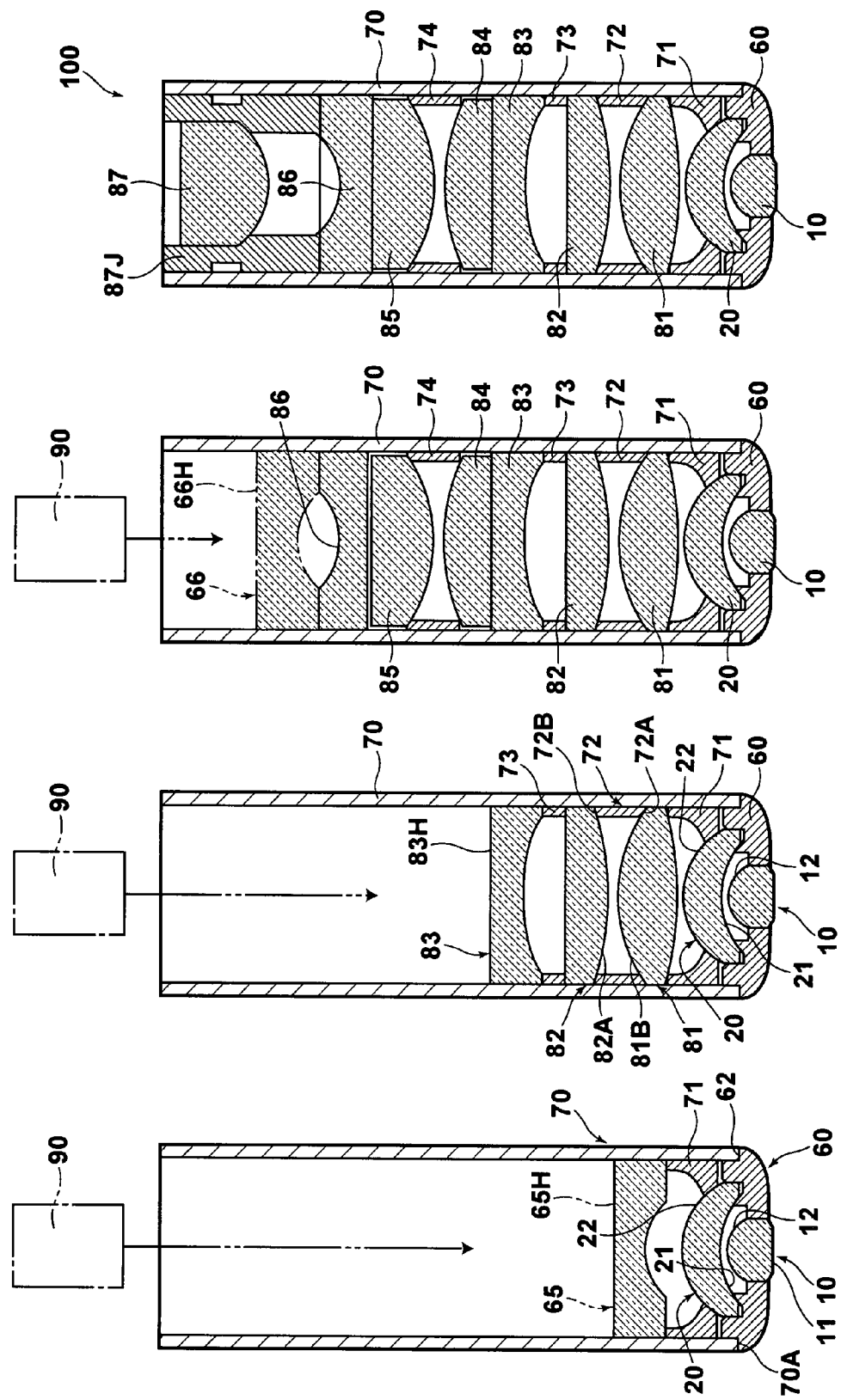

LENS SYSTEM ASSEMBLING METHOD AND SPACING JIG

BACKGROUND OF THE INVENTION

1. Field of the Invention

The present invention relates to a lens system assembling method for assembling a lens system by fixing the positions of two mutually opposing lenses such that the spacing between the two lenses is set at a predetermined distance. The invention also relates to a spacing jig used for the lens system assembling method.

2. Description of the Related Art

The objective lens mounted on an endoscope, a microscope, or the like includes a plurality of lenses disposed in a lens barrel. A method for setting the spacing (also referred to as "air-spacing") between the lenses using a cylindrical spacer ring is known as described, for example, in Japanese Unexamined Patent Publication No. 2003-262774 and U.S. Patent Application Publication No. 20040158129. It is also known that lens setting errors may be within the range from ±0.01 to 0.02 mm by disposing the spacer ring between two lenses and abutting the two lenses to an edge portion of the end faces of the spacer ring. For example, if the spacer ring is disposed between two convex lenses, the lens faces contact the inner edge portion of the end faces of the cylindrical spacer ring, and if the spacer ring is disposed between two concave lenses, the lens faces contact the outer edge portion of the end faces of the spacer ring. Therefore, spacing errors between lenses are mainly dependent on the dimensional accuracy of the spacer ring in the cylinder axis directions and the dimensional accuracy of the inner or outer diameter of the spacer ring.

In the mean time, there is a demand that the spacing between two mutually opposing lenses in an objective lens, which includes a plurality of lenses, be set more accurately, in order to improve the performance of the objective lens. On the other hand, spacer rings are parts to be incorporated and used in objective lenses, and are expected to be produced at a low cost, which inevitably sets a limit on the dimensional accuracy of the spacer rings. In particular, improvement in the dimensional accuracy of the inner diameter is difficult. There is also a problem that the setting error of the spacing between lenses increases as the ratio of the radius D/2 (D is the diameter) of a lens in the direction orthogonal to the optical direction of the lens to the radius of curvature R of the lens face, i.e., the value of D/(2×R) (DR value) becomes closer to 1 (approaches closer to a hemisphere), which results from a dimensional error of the inner or outer diameter of the spacer ring.

The problems described above are not limited to objective lenses, and common to general lens systems in which the spacing between two mutually opposing lenses is set using the spacer ring.

SUMMARY OF THE INVENTION

The present invention has been developed in view of the circumstances described above, and it is an object of the present invention to provide a lens system assembling method capable of setting the spacing between two mutually opposing lenses more accurately without increasing the manufacturing cost of the lens system, and a spacing jig used in the lens system assembling method.

The lens system assembling method of the present invention is a method for assembling a lens system by fixing the positions of two mutually opposing lenses such that the spacing between the two lenses is set at a predetermined distance, the method including the steps of:

providing a spacing jig which includes a first receiving face and a second receiving face formed so as to be oriented towards the same direction spaced apart by the predetermined distance, the first receiving face having a shape corresponding to the shape, with a complementary concave/convex pattern, of the opposing lens face of a first lens, which is one of the two lenses, and the second receiving face having a shape corresponding to the shape, with the same concave/convex pattern, of the opposing lens face of a second lens, which is the other lens of the two lenses, and a lens holding member capable of holding the second lens without blocking light passing through the second lens, the lens holding member including a lens receiving face having a shape corresponding to the shape, with a complementary concave/convex pattern, of the opposing lens face of the second lens;

holding the first lens with the lens holding member, with the opposing lens face of the first lens being brought into close contact with the first receiving face of the spacing jig, and the lens receiving face of the lens holding member being brought into close contact with the second receiving face of the spacing jig;

removing the spacing jig from the first lens and the lens holding member holding the first lens; and abutting the second lens to the lens receiving face of the lens holding member such that the opposing lens face of the second lens is brought into close contact with the lens receiving face.

The spacing jig for use with the lens system assembling method of the present invention is a spacing jig for use with a lens system assembling method for assembling a lens system by fixing the positions of two mutually opposing lenses such that the spacing between the two lenses is set at a predetermined distance, wherein the spacing jig includes a first receiving face and a second receiving face formed so as to be oriented towards the same direction spaced apart by the predetermined distance, the first receiving face having a shape corresponding to the shape, with a complementary concave/convex pattern, of the opposing lens face of a first lens, which is one of the two lenses, and the second receiving face having a shape corresponding to the shape, with the same concave/convex pattern, of the opposing lens face of a second lens, which is the other lens of the two lenses.

The opposing lens face of the first lens is the lens face of the first lens disposed on the side towards the second lens, and the opposing lens face of the second lens is the lens face of the second lens disposed on the side towards the first lens.

The referent of "having a shape corresponding to the shape" as used herein may include the case in which the entire shape corresponds with each other, or the case in which a portion of the shape corresponds with each other.

The lens face may include a spherical face, a planar face, an aspherical face, or a free-form face.

The lens system assembling method described above may be a lens system assembling method in which a spacer ring for setting the spacing between other two mutually opposing lenses, which are different from the mutually opposing two lenses described above, is provided, the spacer ring having an end face shaped to correspond to the shape of at least one of the two mutually opposing lens faces; and setting the spacing between the two lenses by abutting one of the two lenses to the spacer ring such that one of the opposing lens faces is brought into close contact with the end face of the spacer ring having the shape corresponding to the opposing lens face, and abutting the other lens of the two lenses to the other end face of the spacer ring.

The spacer ring for use with the lens system assembling method is a spacer ring for use with a lens system assembling method for assembling a lens system by fixing the positions of two mutually opposing lenses such that the spacing between the two lenses is set at a predetermined distance, which has an end face shaped to correspond to the shape of at least one of the two mutually opposing lens faces.

According to the lens system assembling method of the present invention, and the spacing jig, for use with the lens system assembling method, of the present invention, the lens assembly is performed by the steps of: holding the first lens with the lens holding member, with the opposing lens face of the first lens being brought into close contact with the first receiving face of the spacing jig, and the lens receiving face of the lens holding member being brought into close contact with the second receiving face of the spacing jig; removing the spacing jig from the first lens and the lens holding member holding the first lens; and abutting the second lens to the lens receiving face of the lens holding member such that the opposing lens face of the second lens is brought into close contact with the lens receiving face. This allows the spacing between two mutually opposing lenses to be more accurately set at a predetermined distance, without increasing the manufacturing cost of the lens system. Here, if the lens system is assembled such that the optical axis of the first lens and the optical axis of the second lens are aligned, the performance of the lens system may be further enhanced.

That is, the spacer ring is incorporated and used in the lens system when assembled, unable to be commonly used for the assembly of other lens systems, so that it is expected to be produced at a low cost. On the other hand, the spacing jig is not incorporated in a lens system, so that a single spacing jig may be commonly used for the assembly of many lens systems. Thus, the spacing jig may be readily manufactured with a high degree of accuracy since a low manufacturing cost is not expected for the jig.

Further, setting accuracy of the spacing between two lenses using the spacing jig is not influenced by the DR value described above. That is, the spacing may be set with identical accuracy for lenses having shapes close to a hemisphere or to a planar surface. Therefore, according to the lens system assembling method and the spacing jig described above, the spacing between two mutually opposing lenses may be set more accurately in comparison with the conventional method, without increasing the manufacturing cost of the lens system.

Although the lens holding member described above is incorporated in a lens system, the setting accuracy of the spacing is mainly determined by the dimensional accuracy of the spacing jig, and is not directly influenced by the dimensional accuracy of the lens holding member. Accordingly, a wider manufacturing tolerance may be used, and hence the lens holding member may be manufactured at a low cost, which does not increase the manufacturing cost of the lens system.

BRIEF DESCRIPTION OF THE DRAWINGS

FIG. 4A is a cross-sectional view of the spacing jig and a first lens.

FIG. 4B is a cross-sectional view, illustrating that the opposing lens face of the first lens is brought into close contact with a first receiving face of the spacing jig.

FIG. 4C is a cross-sectional view, illustrating that the first lens is held by the lens holding member with the opposing lens face of the first lens being kept in contact with the first receiving surface of the jig.

FIG. 4D is a cross-sectional view, illustrating that the spacing jig is removed with the first lens being held by the lens holding member.

FIG. 4E is a cross-sectional view, illustrating that the lens holding member holding the first lens is inverted.

FIG. 4F is a cross-sectional view, illustrating the second lens and lens holding member holding the first lens.

FIG. 4G is a cross-sectional view, illustrating that the opposing lens face of the second lens is brought into close contact with a lens receiving face of the lens holding member.

FIG. 5A is a cross-sectional view after two lenses, the first and second lenses are assembled.

FIG. 5B is a cross-sectional view after five lenses are assembled.

FIG. 5C is a cross-sectional view after eight lenses are assembled.

FIG. 5D is a cross-sectional view after all of nine lenses are assembled.

DESCRIPTION OF THE PREFERRED EMBODIMENTS

Figure 1:
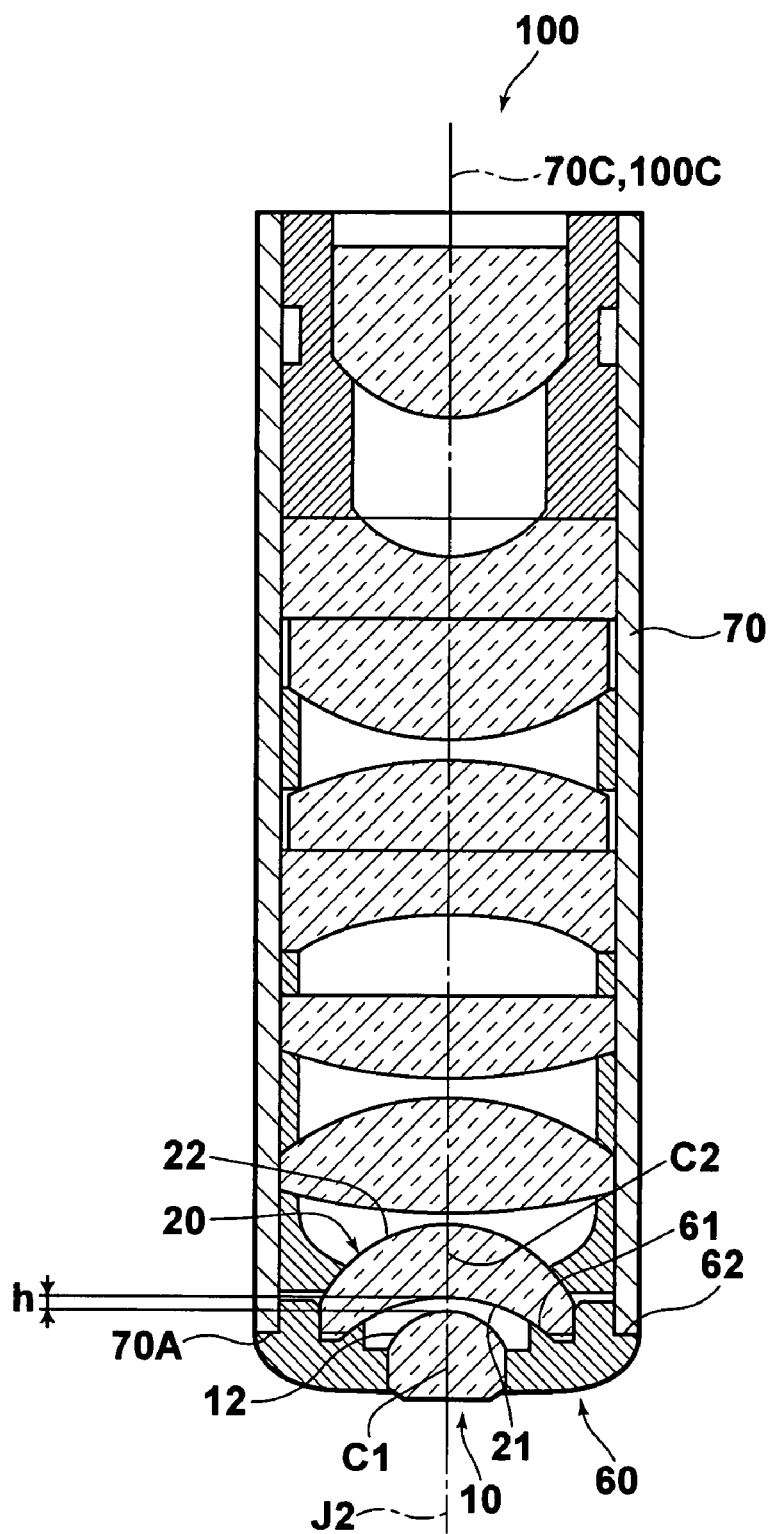
FIG. 1 is a cross-sectional view of a lens system assembled through a lens system assembling method of the present invention, schematically illustrating the construction thereof.
Figure 2:
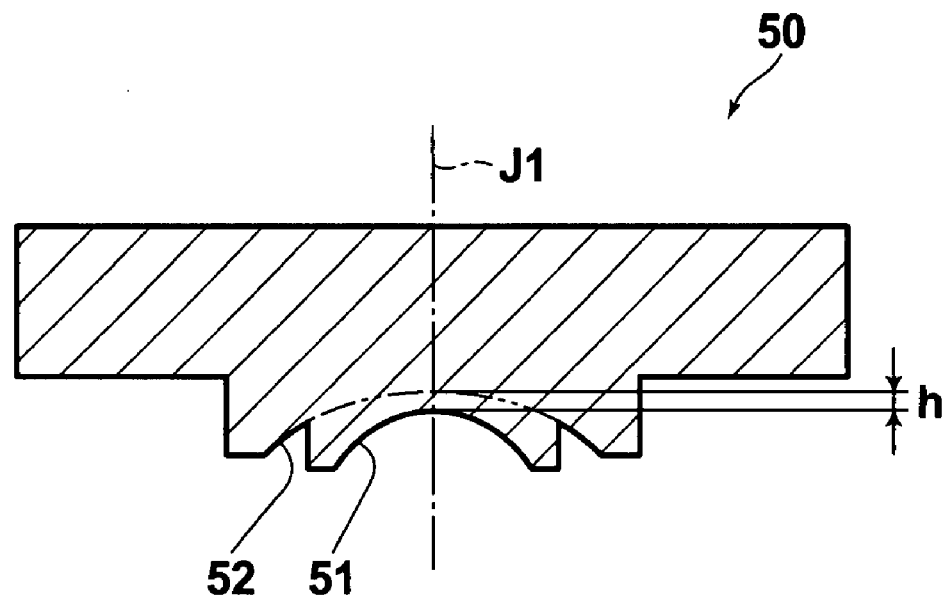
FIG. 2 is a cross-sectional view of a spacing jig used in the lens system assembling method, illustrating the cross-section thereof.
Figure 3:
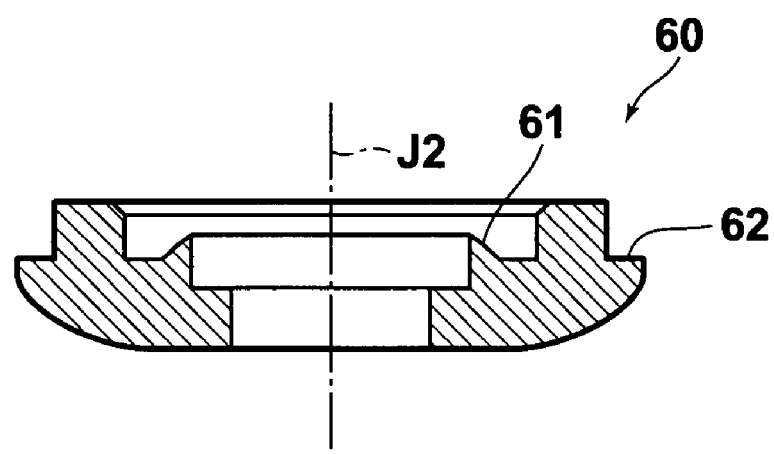
FIG. 3 a cross-sectional view of a lens holding member, illustrating the cross-section thereof.

Hereinafter, an exemplary embodiment of the present invention will be described with reference to the accompanying drawings. FIG. 1 is a cross-sectional view of a lens system assembled through a lens system assembling method of the present invention, schematically illustrating the construction thereof. FIG. 2 is a cross-sectional view of a spacing jig used in the lens system assembling method, illustrating the cross-section thereof. FIG. 3 a cross-sectional view of a lens holding member, illustrating the cross-section thereof.

The lens system 100 shown in FIG. 1, which is an objective lens to be mounted on the distal end of an endoscope, is assembled using the lens system assembling method of the present invention, in which the positions of two mutually opposing lenses, a first lens 10 and a second lens 20, are set such that the spacing between the two lenses becomes a predetermined distance "h".

The lens system assembling method described above uses a spacing jig 50 which includes a first receiving face 51 and a second receiving face 52 formed so as to be oriented towards the same direction spaced apart by the predetermined distance "h". The first receiving face 51 has a shape corresponding to the shape, with a complementary concave/convex pattern, of the opposing lens face 12 of the first lens 10, and the second receiving face 52 has a shape corresponding to the shape, with the same concave/convex pattern, of the opposing lens face 21 of the second lens 20. The lens system assembling method also uses a lens holding member 60 capable of holding the second lens 20 without blocking light passing through the second lens 20. The lens holding member 60 includes a lens receiving face 61 having a shape corresponding to the shape, with a complementary concave/convex pattern, of the opposing lens face 21 of the second lens 20.

The opposing lens face 12 of the first lens 10 is the lens face of the first lens 10 disposed on the side towards the second lens 20. The opposing lens face 21 of the second lens 20 is the lens face of the second lens 20 disposed on the side towards the first lens 10.

Note that the central axis of the first lens 10 is designated as C1, and the central axis of the second lens 20 is designated as C2. Each of the central axes corresponds to each of the optical axes of the lenses. If each of the lens faces forming each of the first and second lenses is spherical, the central axis C1 would pass through the sphere center of each of the lens faces of the first lens 10, and the central axis C2 would pass through the sphere center of each of the lens faces of the second lens 20.

Further, note that the central axis of the spacing jig 50 is designated as J1. If the first receiving face 51 and the second receiving face 52 are lens faces, the central axis J1 would correspond to the optical axis of the spacing jig 50, and if the first receiving face 51 and the second receiving face 52 are spherical, the central axis J1 would pass through the sphere center of the first receiving face 51 and the sphere center of the second receiving face 52.

Still further, the central axis of the lens holding member 60, having a peripheral receiving face 62 which is orthogonal to the rotation axis 70C of a lens barrel 70, described later, is designated as J2. If the lens receiving face 61 and the peripheral receiving face 62 are lens faces, the central axis J2 corresponds to the optical axis of the lens holding member 60, and if the lens receiving face 61 is spherical and the peripheral receiving face 62 is planar, the central axis J2 is orthogonal to the peripheral receiving face and passes through the sphere center of the lens receiving face 61.

The rotation axis 70C corresponds to the optical axis 100C of light beam passing through the lens system 100.

The lens system 100 is assembled in the following manner through the lens system assembling method described above. FIG. 4A is a cross-sectional view, illustrating the spacing jig and the first lens. FIG. 4B is a cross-sectional view, illustrating that the opposing lens face of the first lens is brought into close contact with the first receiving face of the spacing jig. FIG. 4C is a cross-sectional view, illustrating that the first lens is held by the lens holding member with the opposing lens face of the first lens being kept in contact with the first receiving surface of the jig. FIG. 4D is a cross-sectional view, illustrating that the spacing jig is removed with the first lens being held by the lens holding member. FIG. 4E is a cross-sectional view, illustrating that the lens holding member holding the first lens is inverted. FIG. 4F is a cross-sectional view, illustrating the second lens and lens holding member holding the first lens. FIG. 4G is a cross-sectional view, illustrating that the opposing lens face of the second lens is brought into close contact with the lens receiving face of the lens holding member.

First, the opposing lens face 12 of the first lens 10 is brought into close contact with the first receiving face 51 of the spacing jig 50 (FIGS. 4A, 4B).

Then, the lens receiving face 61 of the lens holding member 60 is brought into close contact with the second receiving face 52 of the spacing jig 50 (FIG. 4C).

In the state described above, i.e., the opposing lens face 12 is kept in contact with the first receiving face 51, and the lens receiving face 61 is kept in contact with the second receiving face 52, the first lens 10 is held by the lens holding member 60. Here, the first lens 10 and the lens holding member 60 are integrated together by bonding as an example. Note that the abutting faces and fitting faces of each of the members are formed accurately so that the central axes C1, J1, and J2 of the respective members are aligned with each other when the first lens 10 and the lens holding member 60 are integrated together.

Then, the spacing jig 50 is removed from the first lens 10 and the lens holding member 60 holding the first lens 10. Then the integrated first lens 10 and the lens holding member 60 are inverted in the vertical directions (arrow Z directions in the drawing), (FIGS. 4D, 4E).

Next, the second lens 20 is abutted to the lens receiving face 61 such that the opposing lens face 21 of the second lens 20 is brought into close contact with the lens receiving face 61 of the lens holding member 60 (FIGS. 4F, 4G).

This may set the spacing between the first lens 10 and the second lens 20 at the predetermined distance "h". Then, the lens holding member 60 and the second lens 20 are fixed together. Here, the lens holding member 60 and the second lens 20 are bonded together as an example. This may integrate the first lens 10, the second lens 20, and the lens holding member 60 together.

Note that the abutting faces and fitting faces of each of the members are formed accurately so that the central axes C1, C2, and J2 of the respective members are aligned with each other when the first lens 10, the second lens 20, and the lens holding member 60 are integrated together.

Thereafter, the integrated first lens 10, second lens 20, and lens holding member 60 are fixed on the distal end of the lens barrel 70. More specifically, the lens holding member 60 is fixedly bonded to the lens barrel 70 with the peripheral receiving face 62 abutted to an end face 70A of the lens barrel 70, which is orthogonal to the rotation axis 70C of the lens barrel 70 (FIG. 5A). Note that the central axes C1, C2, and J2 and the rotation axis 70C are aligned with each other when the peripheral receiving face 62 is abutted to the end face 70A of the lens barrel 70.

Here, the first lens 10 is the input side of light from an observation target object. That is, the lens that first receives light from an observation target object is the first lens 10 among the lenses included in the lens system 100, and the lens face that first receives the light is the first lens face 11 of the first lens 10.

Assembly of other lenses, after the first lens 10 and second lens 20 are assembled, will be described next. FIG. 5A is a cross-sectional view after two lenses, the first and second lenses, are assembled. FIG. 5B is a cross-sectional view after five lenses are assembled. FIG. 5C is a cross-sectional view after eight lenses are assembled. FIG. 5D is a cross-sectional view after all of nine lenses are assembled.

One of the end faces of a spacer ring 71 is abutted to a second lens face 22 of the second lens 20, which is the lens face opposite to the opposing lens face 21 of the second lens 20, and an inclination measuring planar plate 65 is abutted to the other end face of the spacer ring 71.

Then, with a planar face 65H, which is one of the faces of the inclination measuring planar plate 65 as the reference face, the spacer ring 71 is adjusted such that the inclination of the reference face becomes 0 using an autocollimator 90.

The end faces of the spacer ring 71 are parallel to each other, and orthogonal to the rotation axis thereof. Further, the other end face of the inclination measuring planar plate 65 contacting with the end face of the spacer ring 71 is parallel to the planar face 65H, which is one of the faces of the inclination measuring planar plate 65.

Next, the inclination measuring planar plate 65 is removed, and a lens 81, a spacer ring 72, a lens 82, a spacer ring 73, and a lens 83 are stacked in this order.

Then, the inclination of a planar face 83H, which is one of the faces of the lens 83, is measured by the autocollimator 90. Here, if the measured value that indicates the inclination of the planar face 83H (inclination value) is greater than or equal to a predetermined value, the dimensional accuracy of each of the stacked members is checked and corrected so that the inclination value falls below the predetermined value.

When the inclination value of the planar face 83H falls below the predetermined value after each of the members is stacked, the lens 83 is fixed to the lens barrel 70.

Setting of spacing between the lens 81 and the lens 82 using the spacer ring 72 will now be described.

The spacer ring 72 supports at least one of an opposing lens face 81B of the lens 81 and an opposing lens face 82A of the lens 82, opposing with each other, by an end face shaped corresponding to the shape of the opposing lens face.

Here, an end face 72A of the spacer ring 72 on the side towards the opposing lens face 81B is formed as the receiving face having a shape corresponding to the shape of the opposing lens face 81B, and an end face 72B of the spacer ring 72 on the side towards the opposing lens face 82A is formed as the receiving face having a shape corresponding to the shape of the opposing lens face 82A. Then, the lenses 81 and 82 are abutted to the end faces 72A and 72B respectively such that the opposing lens face 81B is brought into close contact with the end face 72A of the spacer ring 72, and the opposing lens face 82A is brought into close contact with the end face 72B of the spacer ring 72.

By setting the spacing between two mutually opposing lenses in the manner as described above, the spacing error arising from a dimensional error in the inner or outer diameter of a conventional spacer ring may be prevented.

Next, a lens 84, a spacer ring 74, a lens 85, a lens 86, and a measuring planar plate 66 are stacked on the lens 83 in this order.

Then, the inclination value of a planar face 66H, which is one of the faces of the measuring planar plate 66, is measured by the autocollimator 90. Here, if the inclination value of the planar face 66H is greater than or equal to a predetermined value, the dimensional accuracy of each of the stacked members is checked and corrected so that the inclination value falls below the predetermined value.

When the inclination value of the planar face 66H falls below the predetermined value after each of the members is stacked, the measuring planar plate 66 is removed and the lens 86 is fixed to the lens barrel 70.

Thereafter, a holding section 87J holding a lens 87 is abutted to the lens 86, and the holding section 87J is fixed to the lens barrel 70, thereby the assembly of the lens system 100 is completed.

As described above, according to the lens system assembling method and spacing jig of the present invention, the spacing between two mutually opposing lenses may be set more accurately in comparison with the conventional method, without increasing the manufacturing cost of the lens system.

What is claimed is:

1. A lens system assembling method for assembling a lens system by fixing the positions of two mutually opposing lenses such that the spacing between the two lenses is set at a predetermined distance, the method comprising the steps of:
providing a spacing jig which includes a first receiving face and a second receiving face formed so as to be oriented towards the same direction spaced apart by the predetermined distance, the first receiving face having a shape corresponding to the shape, with a complementary concave/convex pattern, of the opposing lens face of a first lens, which is one of the two lenses, and the second receiving face having a shape corresponding to the shape, with the same concave/convex pattern, of the opposing lens face of a second lens, which is the other lens of the two lenses, and a lens holding member capable of holding the second lens without blocking light passing through the second lens, the lens holding member including a lens receiving face having a shape corresponding to the shape, with a complementary concave/convex pattern, of the opposing lens face of the second lens;

holding the first lens with the lens holding member, with the opposing lens face of the first lens being brought into close contact with the first receiving face of the spacing jig, and the lens receiving face of the lens holding member being brought into close contact with the second receiving face of the spacing jig;

removing the spacing jig from the first lens and the lens holding member holding the first lens; and abutting the second lens to the lens receiving face of the lens holding member such that the opposing lens face of the second lens is brought into close contact with the lens receiving face.

2. A spacing jig for use with a lens system assembling method for assembling a lens system by fixing the positions of two mutually opposing lenses such that the spacing between the two lenses is set at a predetermined distance, wherein the spacing jig includes a first receiving face and a second receiving face formed so as to be oriented towards the same direction spaced apart by the predetermined distance, the first receiving face having a shape corresponding to the shape, with a complementary concave/convex pattern, of the opposing lens face of a first lens, which is one of the two lenses, and the second receiving face having a shape corresponding to the shape, with the same concave/convex pattern, of the opposing lens face of a second lens, which is the other lens of the two lenses.

3. The spacing jig according to claim 2, wherein the central axis of the spacing jig passes through the sphere center of the first receiving face and the sphere center of the second receiving face.

4. The spacing jig according to claim 2, wherein the central axis of the spacing jig corresponds to the central axis of the first receiving face and the central axis of the second receiving face.

5. The spacing jig according to claim 2, wherein the curvature of the first receiving face is smaller than the curvature of the second receiving face.

6. The spacing jig according to claim 3, wherein the curvature of the first receiving face is smaller than the curvature of the second receiving face.

7. The spacing jig according to claim 4, wherein the curvature of the first receiving face is smaller than the curvature of the second receiving face.

* * * * *